(No Model.) 3 Sheets—Sheet 2.

O. C. MILLER.
CORN HARVESTER.

No. 573,895. Patented Dec. 29, 1896.

WITNESSES:
John A. Rennie
J. Fred Acker

INVENTOR
O. C. Miller

BY
ATTORNEYS.

(No Model.) 3 Sheets—Sheet 3.

O. C. MILLER.
CORN HARVESTER.

No. 573,895. Patented Dec. 29, 1896.

WITNESSES:
John A. Rennie
J. Fred Acker

INVENTOR
O. C. Miller
BY
ATTORNEYS.

UNITED STATES PATENT OFFICE.

ORISON C. MILLER, OF HARVEYVILLE, KANSAS.

CORN-HARVESTER.

SPECIFICATION forming part of Letters Patent No. 573,895, dated December 29, 1896.

Application filed June 1, 1895. Serial No. 551,391. (No model.)

*To all whom it may concern:*

Be it known that I, ORISON C. MILLER, of Harveyville, in the county of Wabaunsee and State of Kansas, have invented a new and Improved Corn-Harvester, of which the following is a full, clear, and exact description.

My invention relates to an improvement in corn-harvesters; and it has for its object to provide a machine which will harvest two rows of corn while being drawn over a field, and, furthermore, to provide a harvester wherein the stalks of corn will be held within the machine prior to being cut and wherein the cut corn will fall against a support, from which it may be readily removed by one or more operators without inconveniencing each other; and a further object of the invention is to provide a dumping-platform, upon which the shocks of corn may be readily set up and secured and delivered therefrom in such position that they will be left standing on the field.

Another object of the invention is to provide for a guide for the stalks to the machine which will act equally as well on an irregular as upon a regular row of corn.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
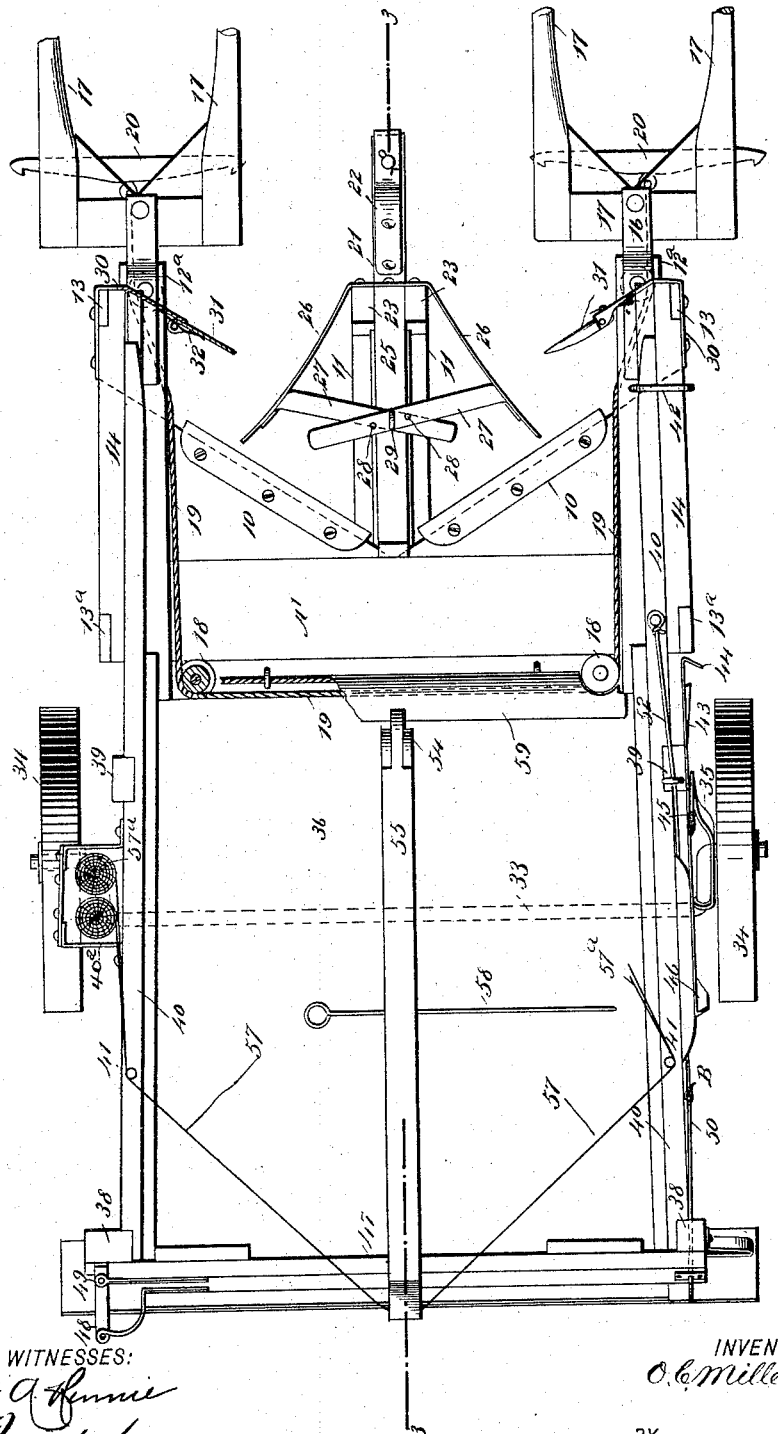
Figure 2:
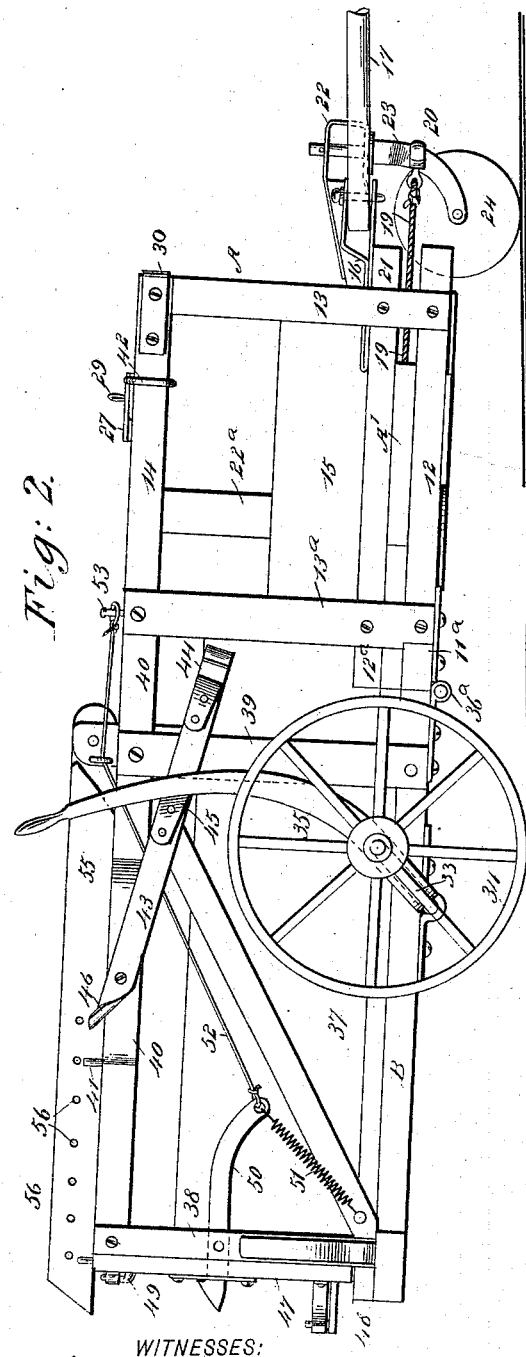
Figure 3:
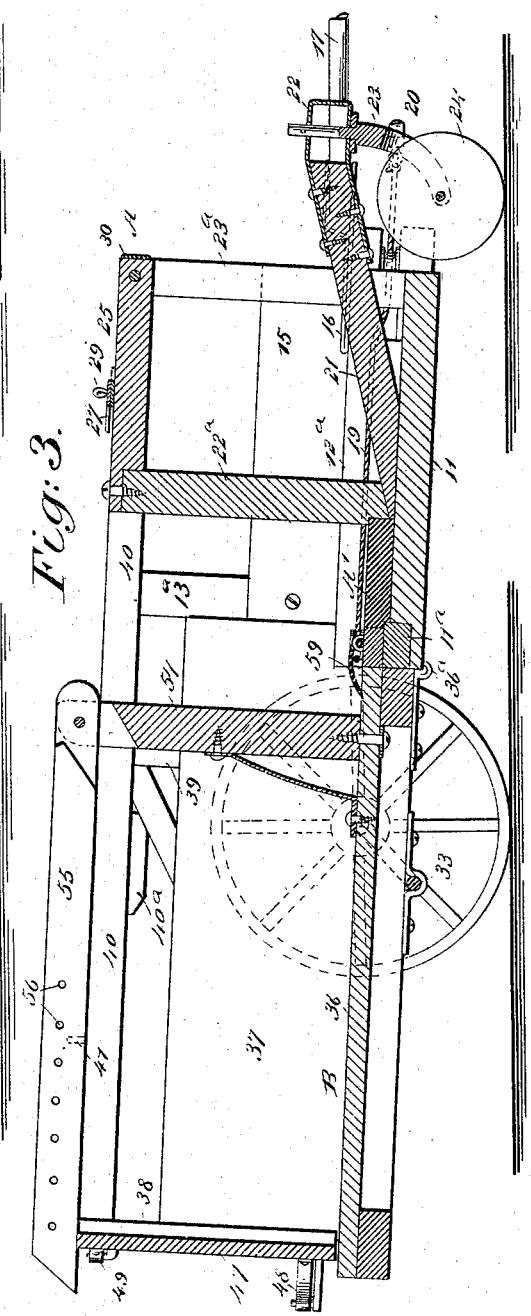
Figures 4, 5:
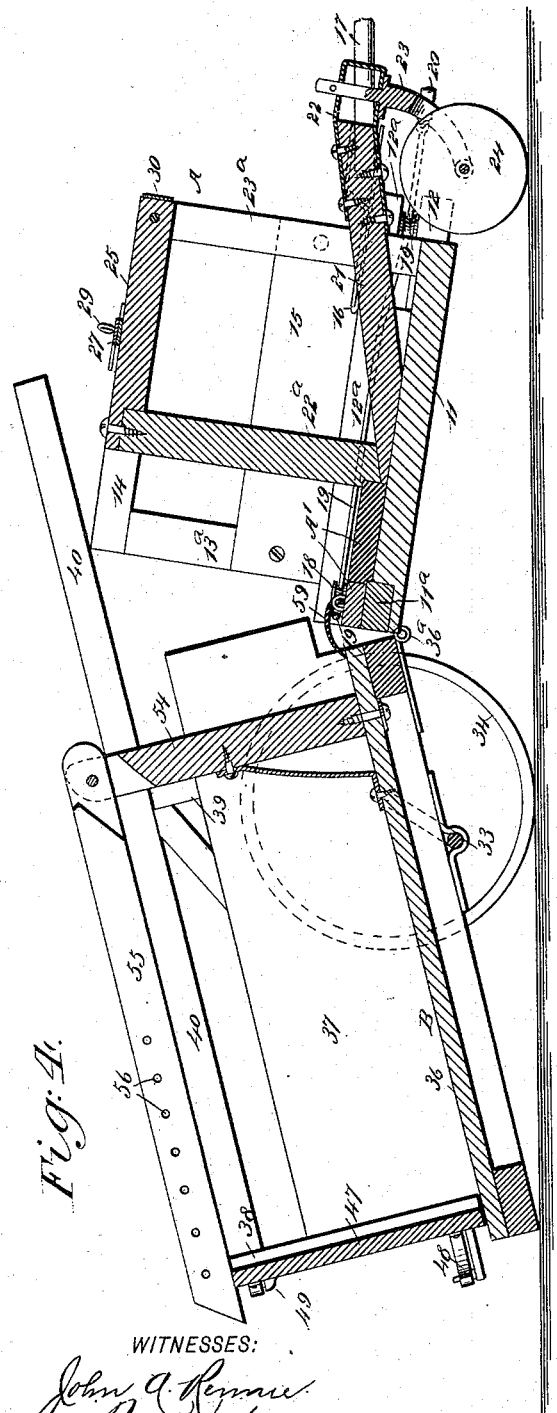

Figure 1 is a plan view of the machine. Fig. 2 is a side elevation thereof. Fig. 3 is a longitudinal vertical section taken substantially on the line 3 3 of Fig. 1, the dumping-platform being shown in its normal position. In this view, however, a central bar employed is shown in side elevation instead of in section. Fig. 4 is a view similar to Fig. 3, the dumping-platform being shown in dumping position; and Fig. 5 is a detail view of one of the guides for the cornstalks.

In carrying out the invention the machine is divided practically into two sections, namely, a forward section A, upon which the knives are located, and a dumping-section B. The forward or receiving section A comprises a platform A', beveled at its forward edge from each outer side inwardly to a central point, and upon each of the beveled surfaces a knife 10 is secured in any suitable or approved manner. At the center of the platform a tongue 11 is secured, which extends a predetermined distance forwardly beyond the knives, and a sill $11^a$ is made to support the platform A' at its rear, to which sill the tongue 11 is also secured. Upper and lower side sills 12 and $12^a$ are attached to the said platform A', extending beyond the forward end thereof, and uprights 13 and $13^a$ are secured to said sills near the front and near the rear at each side, the uprights being connected at the top by a cross-bar 14, and side boards 15 are located immediately above the upper sills $12^a$ and secured to the said uprights, as shown best in Fig. 2.

A clevis 16 is secured to the forward end, preferably, of each upper platform-sill $12^a$, and in each clevis a pair of thills 17 are pivoted or otherwise attached. Friction-rollers 18 are secured upon the upper face of the platform A', as shown in Fig. 1, and a draft cable or chain 19 is made to pass over these friction-rollers and forwardly at each side of the machine to one side of the clevis 16 and below the same, each end of the draft chain or cable having secured to it a singletree 20 or its equivalent, whereby the draft is not transmitted through the thills but through the said cable or chain, thus providing for the equalization of the draft and its application to the rear end of the receiving-section of the machine.

A beam 21 is secured upon the tongue 11, being made to extend upwardly and forwardly therefrom beyond the said receiving-section, as shown in Fig. 3, and this beam is provided at its outer or forward end with a clevis 22 or its equivalent, in which the trunnion of a fork 23 is pivoted, carrying a caster-wheel 24, which serves to support the central portion of the said receiving-section.

An upright $22^a$ is secured to the platform A' at the center thereof or between the knives 10, and at the forward end of the tongue an upright $23^a$ is located at each of its sides, the front uprights and the rear uprights being connected by a cross-bar 25.

Upon the upper forward face of the forward uprights $23^a$ a guide-bar 26 is firmly fastened. This bar is of somewhat angular construction, being horizontally placed, and its members extend rearwardly and in direction of the sides of the machine projecting from each side of the central partition formed by the uprights 22ª and 23ª, as is best shown in Fig. 1. The side members of the guide-bar 26 are made to curve more or less, being concaved upon their forward faces, and these members may be drawn together or spread apart, as occasion may demand, by means of arms 27, which are attached to the members at or near their free ends and are made to cross one another, being provided with apertures 28, through which a pin 29 or its equivalent is passed into the upper cross-beam 25 of the said forward central partition.

A bracket 30 is secured to the forward upper portion of the side uprights 13 and the upper cross-bar 14 of the side portions of the receiving-section A of the machine. These brackets extend inwardly and rearwardly a predetermined distance, and each has a horizontal arm 31 pivoted thereto and held normally in alinement with the bracket through the medium of a spring 32, as shown in Figs. 1 and 5.

The guide-bar 26 and the spring-controlled arms 31 are in advance of the knives, so that as the machine is carried forward the stalks are fed practically into the forward portion of the machine and back of the rear ends of the members of the guide-bar 26 before the stalks are completely severed, thus providing for the banking of the stalks automatically against the central forward partition and the arms 27.

The rear or dumping section B of the machine is mounted upon a crank or yoke axle 33, pivotally connected therewith, the crank-arms of the axle extending upward at each side of this section and serve to carry ground-wheels 34, and the rear portion of the machine may be raised or lowered, according to whether it is used on downgrade or upgrade or leveled on level ground, by means of a lever 35, which is secured to one of the crank-arms of the axle. The said rear or receiving section of the machine may be said to consist of a bottom 36, suitably supported, which is connected with the sill 11ª of the forward platform A' through the medium of hinges 36ª, the receiving-section being adapted to drop at its lower end until it closely approaches or touches the ground.

In addition to the platform or bottom 36 the receiving-section is provided with uprights 38 and 39 at the front and at the rear at each side, connected by an upper longitudinal bar or rail 40, which extends forwardly to an engagement with the inner faces of the corresponding rail or cross-bar 14 of the forward receiving-section of the machine.

In the upper portion of the upper rail of the receiving-section of the machine one or more pins 41 are secured and the receiving and dumping sections are normally held in alinement with each other by passing clips or rings 42, located upon the upper rails 14 of the receiving-section, over the forward extremities of the upper rails 40 of the dumping-section, as shown in Fig. 1.

A locking-bar 43 is secured to the side of the dumping-section at which the adjusting-lever 35 is located, and this bar is preferably given a forward and a downward inclination, being provided at its forward end with end sockets 44 46 to receive the lever, together with an intermediate socket 45, all for the same purpose.

By moving the lever in a forwardly direction the rear end of the dumping-section will be elevated, the two sections being lifted when the lever is in a central position on the locking-bar and depressed when in an extreme rearward position.

An end-gate 47 is provided for the dumping-section B of the machine, and this end-gate is mounted on two hinges 48 and 49, the lower hinge being carried rearward much farther from the rear end of the dumping-section than the upper hinge, as shown in Fig. 1, whereby after the end-gate is opened and released it will normally close, being provided with a keeper to receive a latch 50, pivoted on one side of the said dumping-section, as shown in Fig. 2, the said latch being at its rear end normally drawn downward by a spring 51, maintaining its head in locking-position, and the latch may be released from the keeper when desired by leading a rope, cable, or chain 52 from the forward end of the said latch upward in a forwardly direction along the top of the machine, being attached to a pin 53 or an equivalent support, as shown in Fig. 2. To allow the swinging movement of the gate, as described, the pintles of the hinges may be pivoted to swing laterally.

At the central forward portion of the dumping-section B of the machine an upright 54 is secured, carrying at its upper end one extremity of a bar 55, the two having a pivotal connection, and the rear or free end of this bar is adapted to rest on the end-gate 47 and is provided with a series of longitudinally-placed apertures 56, adapted to receive an abutment or pin 58.

A binding-cord 57 and preferably also a tightening-rope 57ª are placed in the receptacle 40ª, and before starting the shock said cords or ropes are passed around the pin 41 at the left-hand side of the machine, then to an engagement with the top rear portion of the division-bar 55, and around the right hand-pin 41, terminating in front of the former, whereby both cord and rope will be handy to a person at the front end of the rear platform.

The shocks may be built at each side of the division-beam 55 between the said pin 58 and the binding-cord 57. The pin 58 is horizontally located and adapted as a guide for the commencement of the shock.

It will be understood that usually two men are employed in operating this machine.

They may work independently of each other and gather the cut stalks from the forward portion of the machine when they have accumulated in proper quantities and carry these stalks to the dumping-platform, where they are placed in shock form.

In order that the space between the two sections of the machine may be covered, a cover-plate 59 is pivoted or hinged to the forward section, being adapted to extend over the forward edge of the rear section of the machine, both when in its normal and when in its dumping position, and the draft cord or chain 18 passes beneath this cover-plate, being protected thereby.

It is evident that when the shocks are completed on the dumping-platform the gate may be opened by drawing upon the cord or cable 52, and the platform may be dumped by disengaging therefrom the clips 42 or whatever equivalents may be employed.

The binding cords, twine, or whatever is employed for that purpose may be carried in a receptacle or receptacles 40ª, located at one or both sides of the machine. The size of the shock may be regulated by placing the guide-pin 58 in one or the other of the apertures 56 of the partition or beam 55 and against the cord 57 previously stretched, and when the shocks have been built up the end-gates are opened, the dumping-section permitted to drop, the machine continued forward, and the shocks will slip to the ground, remaining thereon in an upright position.

Having thus described my invention, I claim as new and desire to secure by Letters Patent—

1. In a corn-harvester, the combination with a frame and a pair of thills attached to each side thereof, of a central partition, knives extended outward and forward from each side of said partition, adjustable angled guide-bars secured to the partition and extended rearward and laterally, brackets projected from the sides of the frame at the front, and spring-pressed guide-arms pivoted to the brackets and extended at a reverse angle to the guide-bars and normally having their ends in a line, horizontally of the machine, with the ends of the guide-bars whereby the standing corn is bunched and presented to the forward portions of the knives, substantially as specified.

2. In a corn-harvester, the combination with a frame, of a partition therein, knives extended outward and forward from opposite sides of the partition, angled guide-bars secured to the partition and extended rearward and laterally, and spring-pressed guide-arms supported on the sides of the frame and extended at a reverse angle to the guide-bars and normally having their ends in the same vertical longitudinal plane with the ends of the guide-bars, whereby the corn is bunched and presented to the knives, substantially as specified.

ORISON C. MILLER.

Witnesses:
E. E. MITCHELL,
F. H. SEARS.